(12) United States Patent
Mukasa

(10) Patent No.: US 7,903,919 B2
(45) Date of Patent: Mar. 8, 2011

(54) HOLEY FIBER

(75) Inventor: Kazunori Mukasa, Tokyo (JP)

(73) Assignee: Furukawa Electric Co., Ltd., Tokyo (JP)

(*) Notice: Subject to any disclaimer, the term of this patent is extended or adjusted under 35 U.S.C. 154(b) by 0 days.

(21) Appl. No.: 12/720,469

(22) Filed: Mar. 9, 2010

(65) Prior Publication Data

US 2010/0202742 A1 Aug. 12, 2010

Related U.S. Application Data

(63) Continuation-in-part of application No. 12/406,592, filed on Mar. 18, 2009, now abandoned, which is a continuation of application No. PCT/JP2008/066316, filed on Sep. 10, 2008.

(30) Foreign Application Priority Data

Sep. 10, 2007 (JP) ................................. 2007-234635

(51) Int. Cl.
*G02B 6/02* (2006.01)
(52) U.S. Cl. ........................................ 385/125; 385/123
(58) Field of Classification Search ........................ None
See application file for complete search history.

(56) References Cited

U.S. PATENT DOCUMENTS

| | | | |
|---|---|---|---|
| 7,668,428 B2 | 2/2010 | Miyabe et al. | |
| 7,693,378 B2 | 4/2010 | Mukasa | |
| 7,693,380 B2 | 4/2010 | Mukasa | |
| 2002/0118937 A1 | 8/2002 | Broderick et al. | |
| 2005/0238307 A1 | 10/2005 | Hansen et al. | |
| 2008/0138022 A1 | 6/2008 | Tassone | |
| 2008/0199135 A1* | 8/2008 | Proulx | 385/123 |
| 2008/0310806 A1 | 12/2008 | Mukasa | |
| 2009/0046984 A1 | 2/2009 | Mukasa | |
| 2009/0052853 A1 | 2/2009 | Mukasa et al. | |
| 2009/0060438 A1 | 3/2009 | Mori et al. | |

FOREIGN PATENT DOCUMENTS

| | | |
|---|---|---|
| EP | 1 655 625 A1 | 5/2006 |
| GB | 2 386 435 A | 9/2003 |
| JP | 2001-220164 | 8/2001 |
| WO | WO 00/72067 A1 | 11/2000 |
| WO | WO 2005/109056 A1 | 11/2005 |

OTHER PUBLICATIONS

Tetsuya Yamamoto et al., "Nonlinear characteristics of the photonic crystal fibers", Sep. 7, 2007, pp. S-17, S18, and pp. 1-7.
K. Ieda et al., "Visible to Infrarer WDM Transmission over PCF", ECOC2006-Tu 3.3.4, 2006.
U.S. Appl. No. 12/649,388, filed Dec. 30, 2009, Takahashi, et al.
U.S. Appl. No. 12/699,916, filed Feb. 4, 2010, Mukasa.

* cited by examiner

*Primary Examiner* — Tina M Wong
(74) *Attorney, Agent, or Firm* — Oblon, Spivak, McClelland, Maier & Neustadt, L.L.P.

(57) ABSTRACT

A holey fiber has: a core region at a center of the holey fiber; a cladding region around the core region; a plurality of holes included in the cladding region, formed in layers around the core region, arranged to form a triangular lattice having a lattice constant $\Lambda$ of 2 micrometers to 5 micrometers, and each having a diameter of d micrometers; and a wavelength dispersion value of −10 ps/nm/km to 10 ps/nm/km at a wavelength of 1050 nanometers when $d/\Lambda$ is 0.3 to 0.47.

2 Claims, 13 Drawing Sheets

FIG.5

| CALCULATION EXAMPLE | d/Λ | Λ | NUMBER OF LAYERS | FUNDAMENTAL MODE CONFINEMENT LOSS dB/m | WAVELENGTH DISPERSION ps/nm/km | DISPERSION SLOPE ps/nm²/km | Aeff μm² | HIGHER-ORDER MODE CONFINEMENT LOSS dB/m |
|---|---|---|---|---|---|---|---|---|
| 1 | 0.35 | 2.5 | 8 | $8.67 \times 10^{-4}$ | 0.59 | 0.172 | 11.7 | - |
| 2 | 0.35 | 2.5 | 9 | $3.83 \times 10^{-6}$ | 0.59 | 0.172 | 11.7 | - |
| 3 | 0.37 | 2.8 | 7 | $2.42 \times 10^{-4}$ | -0.23 | 0.186 | 13.3 | - |
| 4 | 0.37 | 2.8 | 8 | $9.06 \times 10^{-6}$ | -0.23 | 0.186 | 13.3 | - |
| 5 | 0.40 | 3.0 | 6 | $1.56 \times 10^{-3}$ | -0.26 | 0.192 | 13.9 | $9.43 \times 10^{2}$ |
| 6 | 0.40 | 3.0 | 7 | $1.97 \times 10^{-5}$ | -0.26 | 0.192 | 13.9 | $5.30 \times 10^{2}$ |
| 7 | 0.47 | 3.3 | 5 | $1.83 \times 10^{-4}$ | 0.16 | 0.198 | 14.3 | $5.28 \times 10^{2}$ |
| 8 | 0.47 | 3.3 | 6 | $9.34 \times 10^{-7}$ | 0.16 | 0.198 | 14.3 | $2.33 \times 10^{2}$ |
| 9 | 0.50 | 3.5 | 4 | $3.99 \times 10^{-3}$ | -0.92 | 0.199 | 15.0 | $4.91 \times 10^{1}$ |
| 10 | 0.50 | 3.5 | 5 | $6.41 \times 10^{-6}$ | -0.92 | 0.199 | 15.0 | $1.80 \times 10^{1}$ |
| 11 | 0.50 | 4.0 | 4 | $1.39 \times 10^{-3}$ | -6.64 | 0.198 | 19.3 | $1.43 \times 10^{1}$ |
| 12 | 0.50 | 4.0 | 5 | $2.00 \times 10^{-6}$ | -6.64 | 0.198 | 19.3 | 2.84 |
| 13 | 0.55 | 3.7 | 4 | $4.20 \times 10^{-5}$ | -0.99 | 0.200 | 15.2 | $1.64 \times 10^{-1}$ |
| 14 | 0.55 | 3.7 | 5 | $7.76 \times 10^{-9}$ | -0.99 | 0.200 | 15.2 | $5.44 \times 10^{-3}$ |
| 15 | 0.60 | 4.0 | 3 | $1.36 \times 10^{-3}$ | -2.29 | 0.200 | 16.1 | $3.30 \times 10^{-2}$ |
| 16 | 0.60 | 4.0 | 4 | $4.22 \times 10^{-9}$ | -2.29 | 0.200 | 16.1 | $1.62 \times 10^{-4}$ |
| 17 | 0.63 | 4.0 | 3 | $1.06 \times 10^{-4}$ | -0.87 | 0.202 | 15.3 | $2.25 \times 10^{-3}$ |
| 18 | 0.63 | 4.0 | 4 | $4.80 \times 10^{-9}$ | -0.87 | 0.202 | 15.3 | $3.33 \times 10^{-6}$ |
| 19 | 0.69 | 4.2 | 3 | $2.01 \times 10^{-7}$ | -0.38 | 0.203 | 15.2 | $1.14 \times 10^{-6}$ |
| 20 | 0.69 | 4.2 | 4 | $7.38 \times 10^{-13}$ | -0.38 | 0.203 | 15.2 | $2.97 \times 10^{-11}$ |
| 21 | 0.75 | 4.5 | 3 | $2.67 \times 10^{-11}$ | -0.95 | 0.203 | 15.6 | $1.48 \times 10^{-10}$ |
| 22 | 0.75 | 4.5 | 4 | $5.09 \times 10^{-18}$ | -0.95 | 0.203 | 15.6 | $4.34 \times 10^{-16}$ |

| | CONFINEMENT LOSS | WAVELENGTH DISPERSION | DISPERSION SLOPE | Aeff | TRANSMISSION LOSS |
|---|---|---|---|---|---|
| | dB/km | ps/nm/km | ps/nm$^2$/km | $\mu m^2$ | dB/km |
| CALCULATION EXAMPLE 7 | $1.83 \times 10^{-1}$ | 0.16 | 0.198 | 14.3 | n/a |
| PRODUCTION EXAMPLE 1 | n/a | 0.28 | 0.199 | 14.7 | 7.0 |
| CALCULATION EXAMPLE 10 | $6.41 \times 10^{-3}$ | -0.92 | 0.199 | 15.0 | n/a |
| PRODUCTION EXAMPLE 2 | n/a | -0.81 | 0.199 | 15.1 | 2.7 |

FIG.13

| WAVELENGTH | 1050 nm | | | 1550 nm | | |
|---|---|---|---|---|---|---|
| λ | WAVELENGTH DISPERSION | DISPERSION SLOPE | Aeff | WAVELENGTH DISPERSION | DISPERSION SLOPE | Aeff |
| μm | ps/nm/km | ps/nm²/km | μm² | ps/nm/km | ps/nm²/km | μm² |
| 2.0 | 31.9 | 0.177 | 5.6 | 58.9 | -0.033 | 6.8 |
| 2.5 | 17.8 | 0.197 | 8.2 | 67.6 | 0.039 | 9.3 |
| 3.0 | 6.9 | 0.200 | 11.3 | 62.8 | 0.062 | 12.5 |
| 3.5 | -0.9 | 0.199 | 15.0 | 56.5 | 0.070 | 16.3 |
| 4.0 | -6.6 | 0.198 | 19.3 | 50.9 | 0.072 | 20.6 |
| 5.0 | -14.1 | 0.195 | 29.4 | 42.6 | 0.073 | 30.9 |
| 6.0 | -18.5 | 0.192 | 41.6 | 37.3 | 0.072 | 43.3 |
| 7.0 | -21.4 | 0.190 | 55.9 | 33.6 | 0.071 | 57.9 |
| 8.0 | -23.3 | 0.189 | 72.5 | 31.2 | 0.070 | 74.7 |
| 10.0 | -25.6 | 0.087 | 112.0 | 28.0 | 0.068 | 114.6 |

FIG.15

THREE LAYERS

| Λ [μm] | WAVELENGTH [μm] | 0.55 | 1.05 | 1.55 | 1.65 | 1.70 |
|---|---|---|---|---|---|---|
| 2.0 | CONFINEMENT LOSS [dB/m] | $3.72\times10^{-2}$ | 1.97 | $6.90\times10^{1}$ | $1.30\times10^{2}$ | $1.76\times10^{2}$ |
| 2.5 | | $1.18\times10^{-2}$ | $3.20\times10^{-1}$ | 6.79 | $1.21\times10^{1}$ | $1.62\times10^{1}$ |
| 3.0 | | $5.10\times10^{-3}$ | $8.91\times10^{-2}$ | 1.24 | 2.07 | 2.67 |
| 3.5 | | $2.69\times10^{-3}$ | $3.42\times10^{-2}$ | $3.42\times10^{-1}$ | $5.38\times10^{-1}$ | $6.74\times10^{-1}$ |
| 4.0 | | $1.61\times10^{-3}$ | $1.62\times10^{-2}$ | $1.26\times10^{-1}$ | $1.88\times10^{-1}$ | $2.30\times10^{-1}$ |
| 5.0 | | $7.22\times10^{-4}$ | $5.25\times10^{-3}$ | $2.91\times10^{-2}$ | $4.06\times10^{-2}$ | $4.79\times10^{-2}$ |
| 6.0 | | $3.98\times10^{-4}$ | $2.36\times10^{-3}$ | $1.06\times10^{-2}$ | $1.41\times10^{-2}$ | $1.63\times10^{-2}$ |
| 7.0 | | $2.51\times10^{-4}$ | $1.27\times10^{-3}$ | $4.83\times10^{-3}$ | $6.22\times10^{-3}$ | $7.05\times10^{-3}$ |
| 2.0 | Aeff [μm²] | 5.33 | 6.21 | 7.85 | 8.38 | 8.69 |
| 2.5 | | 8.10 | 9.05 | 10.49 | 10.89 | 11.10 |
| 3.0 | | 11.46 | 12.51 | 13.94 | 14.29 | 14.48 |
| 3.5 | | 15.42 | 16.57 | 18.04 | 18.40 | 18.58 |
| 4.0 | | 19.96 | 21.22 | 22.78 | 23.13 | 23.32 |
| 5.0 | | 30.80 | 32.30 | 34.05 | 34.44 | 34.64 |
| 6.0 | | 43.99 | 45.74 | 47.71 | 48.14 | 48.36 |
| 7.0 | | 59.50 | 61.50 | 63.70 | 64.17 | 64.41 |

FIG.16

| Λ [μm] | WAVELENGTH [μm] | FOUR LAYERS | | | | | |
|---|---|---|---|---|---|---|---|
| | | 0.55 | 1.05 | 1.55 | 1.65 | 1.70 | |
| | CONFINEMENT LOSS [dB/m] | | | | | | |
| 2.0 | | $1.37×10^{-4}$ | $2.43×10^{-2}$ | 2.86 | 6.74 | $1.02×10^{1}$ | |
| 2.5 | | $3.37×10^{-5}$ | $2.37×10^{-3}$ | $1.36×10^{-1}$ | $2.98×10^{-1}$ | $4.37×10^{-1}$ | |
| 3.0 | | $1.23×10^{-5}$ | $4.74×10^{-4}$ | $1.50×10^{-2}$ | $2.97×10^{-2}$ | $4.17×10^{-2}$ | |
| 3.5 | | $5.56×10^{-6}$ | $1.43×10^{-4}$ | $2.91×10^{-3}$ | $5.29×10^{-3}$ | $7.13×10^{-3}$ | |
| 4.0 | | $3.05×10^{-6}$ | $5.69×10^{-5}$ | $8.21×10^{-4}$ | $1.39×10^{-3}$ | $1.81×10^{-3}$ | |
| 5.0 | | $1.23×10^{-6}$ | $1.47×10^{-5}$ | $1.33×10^{-4}$ | $2.04×10^{-4}$ | $2.53×10^{-4}$ | |
| 6.0 | | $5.92×10^{-7}$ | $5.43×10^{-6}$ | $3.64×10^{-5}$ | $5.26×10^{-5}$ | $6.32×10^{-5}$ | |
| 7.0 | | $3.59×10^{-7}$ | $2.60×10^{-6}$ | $1.42×10^{-5}$ | $1.97×10^{-5}$ | $2.31×10^{-5}$ | |
| | Aeff [μm²] | | | | | | |
| 2.0 | | 5.33 | 6.21 | 7.81 | 8.30 | 8.58 | |
| 2.5 | | 8.10 | 9.05 | 10.48 | 10.87 | 11.08 | |
| 3.0 | | 11.46 | 12.51 | 13.94 | 14.29 | 14.48 | |
| 3.5 | | 15.42 | 16.57 | 18.04 | 18.39 | 18.58 | |
| 4.0 | | 19.96 | 21.22 | 22.78 | 23.13 | 23.32 | |
| 5.0 | | 30.80 | 32.30 | 34.05 | 34.44 | 34.64 | |
| 6.0 | | 43.97 | 45.72 | 47.69 | 48.12 | 48.34 | |
| 7.0 | | 59.50 | 61.50 | 63.70 | 64.18 | 64.42 | |

FIG.17

| Λ [μm] | WAVELENGTH [μm] | FIVE LAYERS | | | | | |
|---|---|---|---|---|---|---|---|
| | | 0.55 | 1.05 | 1.55 | 1.65 | 1.70 | |
| 2.0 | CONFINEMENT LOSS [dB/m] | $5.10 \times 10^{-7}$ | $3.11 \times 10^{-1}$ | $1.22 \times 10^{-1}$ | $3.59 \times 10^{-1}$ | $6.06 \times 10^{-1}$ | |
| 2.5 | | $9.72 \times 10^{-8}$ | $1.82 \times 10^{-5}$ | $2.84 \times 10^{-3}$ | $7.53 \times 10^{-2}$ | $1.22 \times 10^{-2}$ | |
| 3.0 | | $2.99 \times 10^{-8}$ | $2.68 \times 10^{-6}$ | $1.90 \times 10^{-4}$ | $4.44 \times 10^{-4}$ | $6.78 \times 10^{-4}$ | |
| 3.5 | | $1.23 \times 10^{-8}$ | $6.35 \times 10^{-7}$ | $2.60 \times 10^{-5}$ | $5.45 \times 10^{-5}$ | $7.89 \times 10^{-5}$ | |
| 4.0 | | $4.25 \times 10^{-9}$ | $2.11 \times 10^{-7}$ | $5.52 \times 10^{-6}$ | $1.06 \times 10^{-5}$ | $1.47 \times 10^{-5}$ | |
| 5.0 | | $2.02 \times 10^{-9}$ | $5.40 \times 10^{-8}$ | $6.05 \times 10^{-7}$ | $1.03 \times 10^{-6}$ | $1.34 \times 10^{-6}$ | |
| 6.0 | | $9.90 \times 10^{-10}$ | $1.28 \times 10^{-8}$ | $1.31 \times 10^{-7}$ | $2.02 \times 10^{-7}$ | $2.58 \times 10^{-7}$ | |
| 7.0 | | $4.32 \times 10^{-10}$ | $5.30 \times 10^{-9}$ | $4.14 \times 10^{-8}$ | $6.53 \times 10^{-8}$ | $7.50 \times 10^{-8}$ | |
| 2.0 | Aeff [μm²] | 5.33 | 6.21 | 7.81 | 8.30 | 8.57 | |
| 2.5 | | 8.10 | 9.05 | 10.48 | 10.87 | 11.08 | |
| 3.0 | | 11.46 | 12.51 | 13.93 | 14.29 | 14.48 | |
| 3.5 | | 15.42 | 16.57 | 18.04 | 18.39 | 18.58 | |
| 4.0 | | 19.96 | 21.22 | 22.78 | 23.13 | 23.32 | |
| 5.0 | | 30.75 | 32.28 | 34.03 | 34.42 | 34.62 | |
| 6.0 | | 43.91 | 45.75 | 47.68 | 48.11 | 48.33 | |
| 7.0 | | 59.41 | 61.46 | 63.68 | 64.16 | 64.40 | |

HOLEY FIBER

CROSS-REFERENCE TO RELATED APPLICATIONS

This application is a continuation-in-part of U.S. application Ser. No. 12/406,592, filed on Mar. 18, 2009, which is a continuation of PCT/JP2008/066316, filed on Sep. 10, 2008, the entire contents of both of which are incorporated herein by reference. PCT/JP08/066,316 claims the benefit of priority from Japanese Patent Application No. 2007-234635 filed on Sep. 10, 2007.

BACKGROUND OF THE INVENTION

1. Field of the Invention

The present invention relates to a holey fiber.

2. Description of the Related Art

A holey fiber or a photonic crystal fiber is a new type of optical fiber that has a core region formed at a center of the optical fiber and a cladding region surrounding the core region and having a plurality of holes around the core region, where the cladding region has the reduced average refractive index because of the presence of the holes so that a light propagates through the core region by the principle of the total reflection of light. Because the refractive index is controlled by the holes, the holey fibers can realize unique properties such as endlessly single mode (ESM) characteristics and a zero-dispersion wavelength shifted towards extremely shorter wavelengths, which cannot be realized with conventional optical fibers. The ESM means that a cut-off wavelength is not present and a light is transmitted in a single mode at all wavelengths. With the ESM, it is possible to realize an optical transmission at a high transmission speed over a broad bandwidth.

In recent years, a technology related to ytterbium-doped optical fibers (YDF) is maturing, which can be used as amplifying optical fibers at a 1.0-micrometer wavelength band (e.g., 1000 nanometers to 1100 nanometers) around a wavelength of 1050 nanometers. The demand for optical fibers that can be applied to fiber lasers for the 1.0-micrometer wavelength band, optical fibers for supercontinuum (SC) light sources, or optical transmission lines has thus increased. Holey fibers are being hoped to meet this demand. For example, experimental results of performing optical transmission in a wide band including a wavelength of 1064 nanometers using a holey fiber as an optical transmission line have been reported (see K. Ieda, et al., "Visible to Infrared WDM transmission over PCF", ECOC 2006-Tu3.3.4, 2006).

However, in the conventional holey fiber, a wavelength dispersion value in the wavelength band of 1.0 μm is about −20 ps/nm/km or smaller. That is, its absolute value is relatively large. Therefore, when the conventional holey fiber is used as an optical transmission line for a long-haul transmission of optical signals in the wavelength band of 1.0 μm, the optical signals are extremely distorted, which is problematic.

SUMMARY OF THE INVENTION

According to an aspect of the present invention, a holey fiber includes: a core region at a center of the holey fiber; a cladding region around the core region; a plurality of holes included in the cladding region, formed in layers around the core region, arranged to form a triangular lattice having a lattice constant Λ of 2 micrometers to 5 micrometers, and each having a diameter of d micrometers; and a wavelength dispersion value of −10 ps/nm/km to 10 ps/nm/km at a wavelength of 1050 nanometers when d/Λ is 0.3 to 0.47.

The above and other features, advantages, and technical and industrial significance of this invention will be better understood by reading the following detailed description of presently preferred embodiments of the invention, when considered in connection with the accompanying drawings.

BRIEF DESCRIPTION OF THE DRAWINGS

FIG. 5 is a table listing design parameters and optical characteristics at the wavelength of 1050 nm with respect to each of HFs according to Calculation Examples 1 to 22;

FIG. 13 is a table listing, for the HF depicted in FIG. 1, the optical characteristics at wavelengths of 1050 nm and 1550 nm when d/Λ is set to 0.50 and Λ is changed from 2.0 μm to 10.0 μm;

FIG. 15 is a table listing optical characteristics at wavelengths between 0.55 μm to 1.70 μm, when the number of layers of the holes of the HF depicted in FIG. 1 is set to three, d/Λ is set to 0.45, and Λ is changed from 2.0 μm to 7.0 μm;

FIG. 16 is a table listing optical characteristics at wavelengths between 0.55 μm to 1.70 μm, when the number of layers of the holes of the HF depicted in FIG. 1 is set to four, d/Λ is set to 0.45, and Λ is changed from 2.0 μm to 7.0 μm; and FIG. 17 is a table listing optical characteristics at wavelengths between 0.55 μm to 1.70 μm, when the number of layers of the holes of the HF depicted in FIG. 1 is set to five, d/Λ is set to 0.45, and Λ is changed from 2.0 μm to 7.0 μm.

DETAILED DESCRIPTION OF THE PREFERRED EMBODIMENTS

Exemplary embodiments of a holey fiber of the present invention are explained in detail below with reference to the accompanying drawings. The present invention is not limited to the following embodiments and the embodiments may be modified in various ways without departing from the spirit of the invention. A holey fiber is referred to as "HF" in the following description. The terms and methods which are not particularly defined in this specification follow the definitions and measurement methods defined by ITU-T (International Telecommunication Union Telecommunication Standardization Sector) G.650.1.

Figure 1:
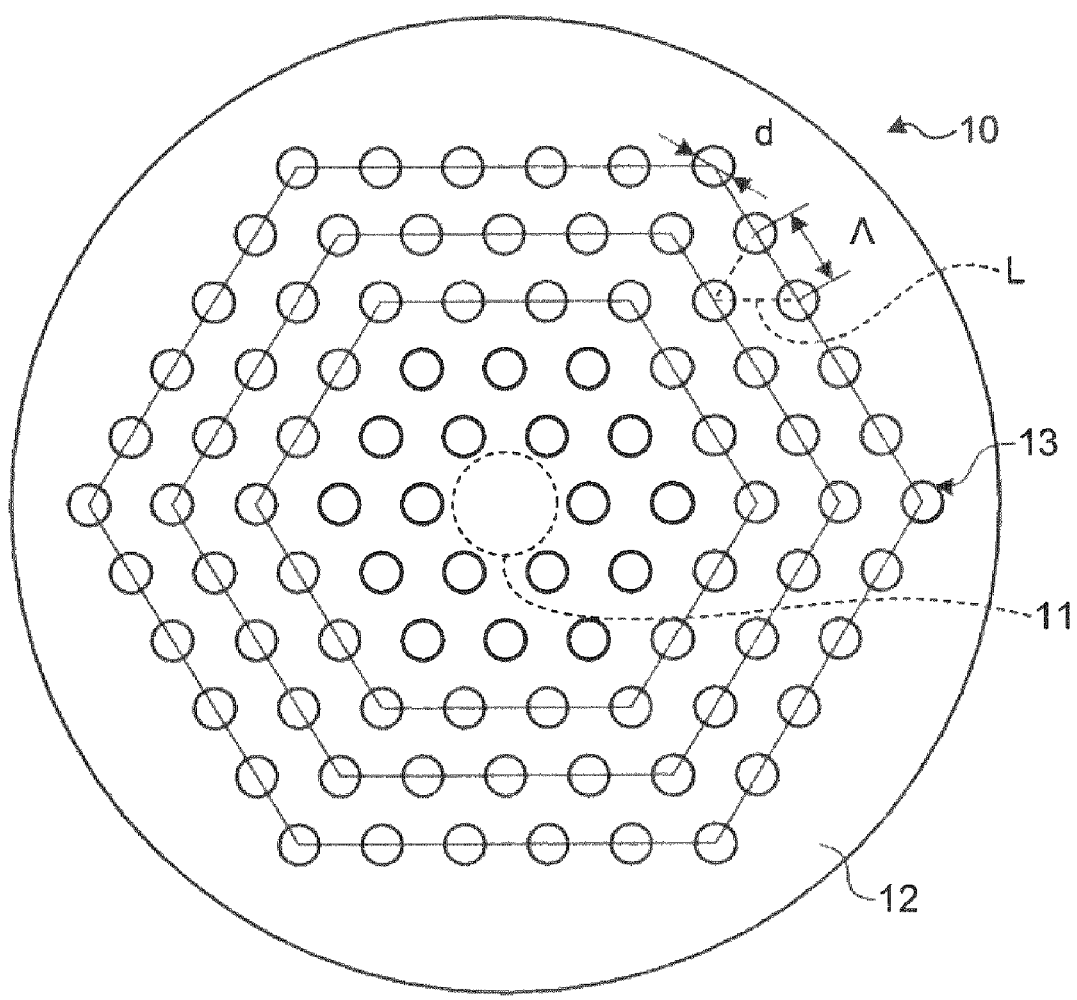
FIG. 1 is a schematic sectional view of an HF according to an embodiment of the present invention.

FIG. 1 is a schematic sectional view of an HF 10 according to an embodiment of the present invention. As depicted in FIG. 1, the HF 10 includes a core region 11 at a center of the HF 10 and a cladding region 12 surrounding the core region 11. The core region 11 and the cladding region 12 are made of pure silica glass added with no dopant for adjusting a refractive index.

The cladding region 12 contains holes 13 arranged in layers around the core region 11. A group of the holes 13 arranged at each apex of an equilateral hexagon around the core region 11 are referred to as a layer. The holes 13 are arranged not only in layers but also in a triangular lattice L. A diameter of each of the holes 13 is represented by "d" and a lattice constant of the triangular lattice "L", that is, a distance between the centers of the holes 13 is represented by "Λ".

The HF 10 has Λ of 2 μm to 5 μm, d/Λ of 0.3 to 0.75, and a wavelength dispersion value of −10 ps/nm/km to 10 ps/nm/km at the wavelength of 1050 nm. Thus, because an absolute value of the wavelength dispersion value in the wavelength band of 1.0 μm becomes sufficiently small, the HF 10 is suitable for an optical transmission line for a long-haul optical transmission in the wavelength band of 1.0 μm. If a transmission speed of an optical signal is 40 Gbps, an absolute value of cumulative wavelength dispersion of an optical transmission line per span needs to be about 100 ps/nm or smaller. Thus, with a use of the HF 10, a long-haul optical transmission line of 10 km or longer per span can be configured.

Because an absolute value of the wavelength dispersion value in the wavelength band of 1.0 μm is sufficiently small, the HF 10 is suitable as an optical fiber for the wavelength band of 1.0 μm such as an optical fiber for an SC light source or a fiber laser.

Furthermore, because the HF 10 is configured such that the holes 13 of uniform diameter are arranged in the triangular lattice L, similarly to a conventional HF, the HF 10 can be easily manufactured by using a conventional stack-and-draw method.

The present invention is specifically explained below with reference to results of calculations using a finite element method (FEM) simulation.

Figure 2:
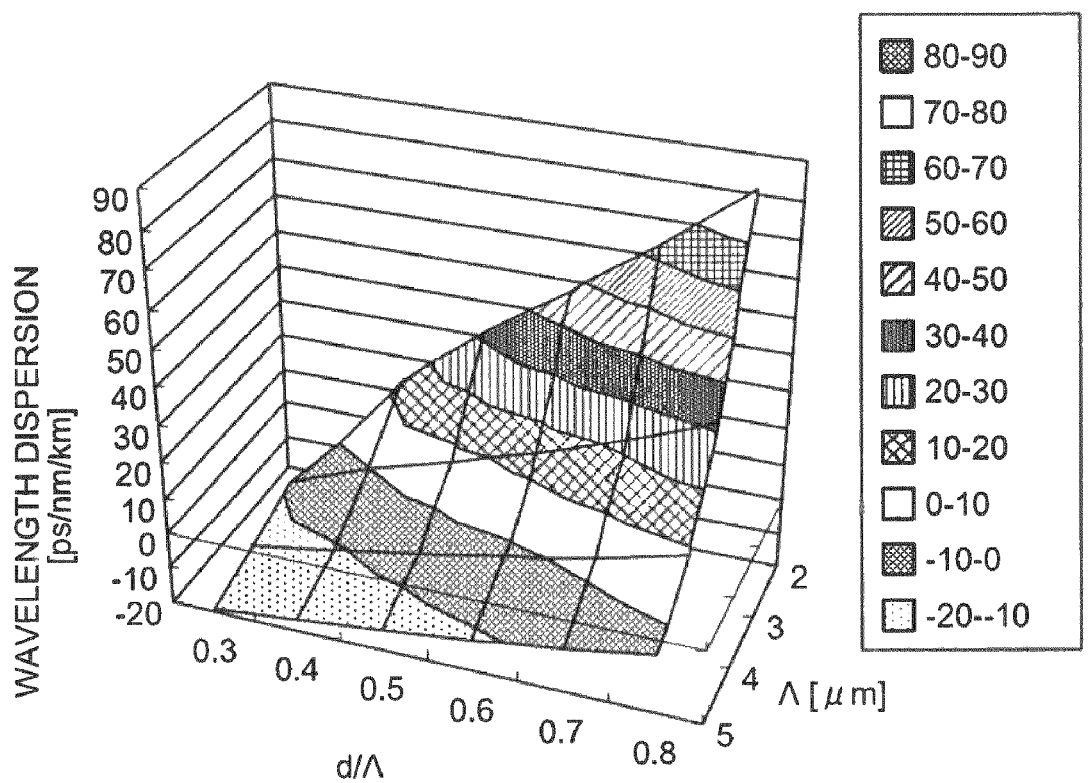
FIG. 2 is a diagram illustrating variation in a wavelength dispersion value at a wavelength of 1050 nm when a distance between holes Λ and a ratio d/Λ of a hole diameter d to the distance Λ are changed in the HF depicted in FIG. 1.

FIG. 2 is a diagram illustrating variation in a wavelength dispersion value at the wavelength of 1050 nm when the distance between holes Λ and a ratio d/Λ of a hole diameter d to the distance Λ are changed in the HF 10 depicted in FIG. 1. As depicted in FIG. 2, a wavelength dispersion value of the HF 10 results in a range of −10 ps/nm/km to 10 ps/nm/km when Λ is 2 μm to 5 μm and d/Λ is 0.3 to 0.75.

Figure 3:
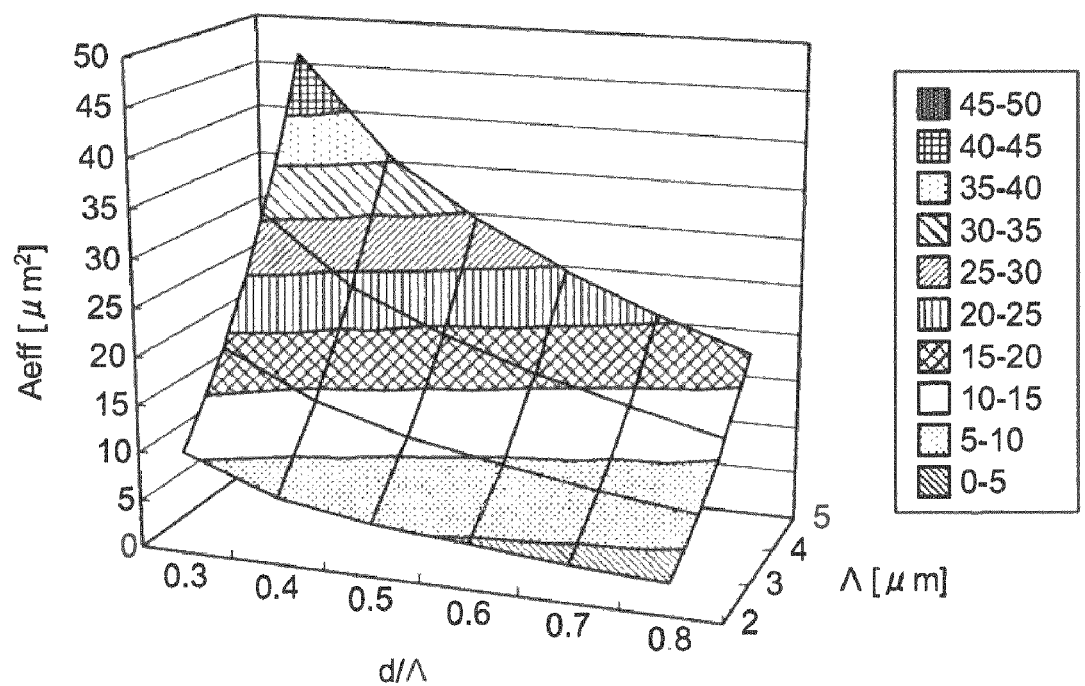
FIG. 3 is a diagram illustrating variation in an effective core area at the wavelength of 1050 nm when the distance between holes Λ and the ratio d/Λ are changed in the HF depicted in FIG. 1.

Furthermore, FIG. 3 is a diagram illustrating variation in an effective core area Aeff at the wavelength of 1050 nm when the distance between holes Λ and the ratio d/Λ are changed in the HF 10. As depicted in FIG. 3, the effective core area of the HF 10 is 10 μm² or larger when Λ is 2 μm to 5 μm and d/Λ is 0.3 to 0.75. It is preferable if the effective core area of the HF 10 is 10 μm² or larger, as connectivity to a conventional optical fiber by fusion splicing is enhanced.

Figure 4:
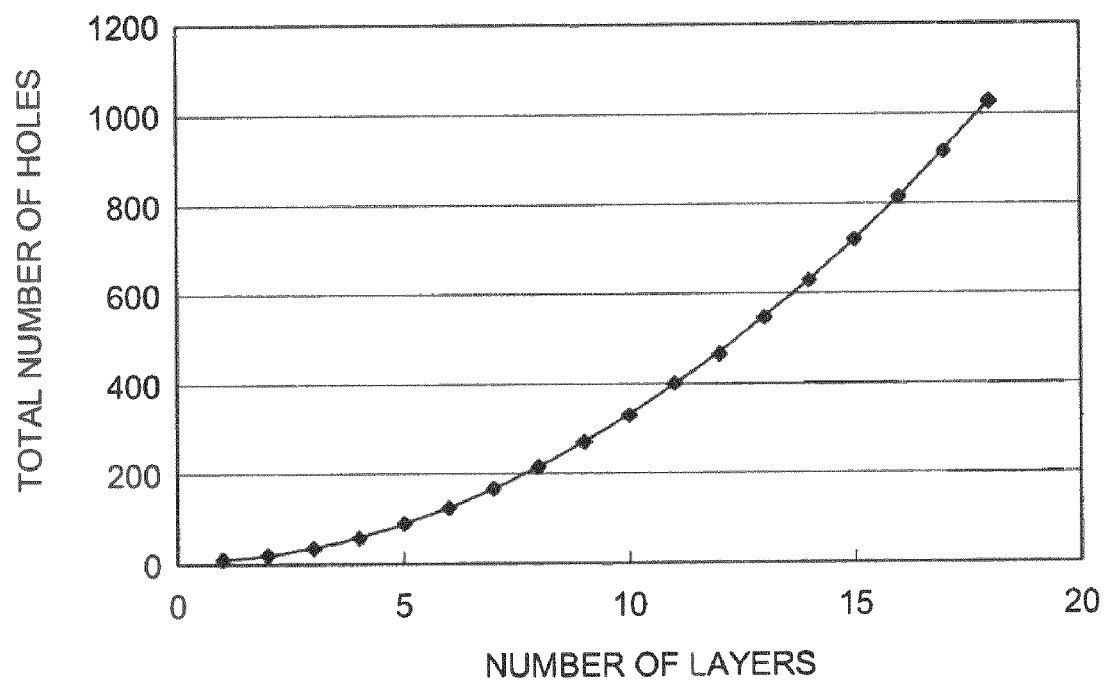
FIG. 4 is a diagram illustrating a relationship between the number of layers of holes and the total number of holes that are arranged in a triangular lattice.

In FIGS. 2 and 3, for each combination of Λ and d/Λ for which the wavelength dispersion value at the wavelength of 1050 nm results in a range of −10 ps/nm/km to 10 ps/nm/km and the effective core area becomes 10 μm² or larger, a small confinement loss of 0.2 dB/km or smaller, or more preferably 0.1 dB/km or smaller, which has no substantial influence on the overall transmission loss in the HF, is achieved. If d/Λ is decreased, an effect of optical confinement by the holes 13 is reduced. Therefore, to maintain the confinement loss of 0.1 dB/km or smaller, the number of layers of the holes 13 needs to be increased. However, if the number of layers is increased while the holes 13 are arranged in a triangular lattice, the total number of the holes 13 increases sharply. FIG. 4 is a diagram illustrating a relationship between the number of layers of the holes 13 and the total number of the holes 13 when the holes 13 are arranged in a triangular lattice. As depicted in FIG. 4, as the number of layers of the holes 13 is increased, the total number of the holes 13 is increases sharply. Therefore, the number of glass capillaries necessary for manufacturing the HF 10 by a stack-and-draw method increases sharply, making the manufacture more complicated. Considering that most of conventional HFs have no more than seven layers of holes, it is preferable that the number of layers of the holes 13 are seven or less. To achieve the confinement loss of 0.1 dB/km or smaller when the number of layers of the holes 13 is seven or less, d/Λ is preferably 0.4 or larger.

If d/Λ is increased, an effect of optical confinement by the holes 13 is enhanced and thus the HF 10 tends to demonstrate multi-mode operation. To achieve single-mode operation in the HF 10 at a wavelength of 1000 nm, d/Λ is preferably 0.6 or smaller. When the use of the HF 10 in an actual field is considered, to ensure stable single-mode operation, it is preferable that confinement loss of a higher-order mode of lowest order (hereinafter, "first higher-order mode") of optical propagation modes is sufficiently large at 100 dB/m or more. To achieve the confinement loss of the first higher-order mode of 100 dB/m or more, d/Λ is preferably 0.47 or less.

If d/Λ of the HF 10 is 0.4 to 0.6, by setting Λ to 2.5 μm to 4.5 μm, the wavelength dispersion value of −10 ps/nm/km to 10 ps/nm/km at the wavelength of 1050 nm is achieved.

Next, specific calculation examples will be explained. FIG. 5 is a table listing design parameters d/Λ, Λ, and number of hole layers, and optical characteristics at the wavelength of 1050 nm for each of HFs having the same structure as that of the HF 10 with the different design parameters according to Calculation Examples 1 to 22. In FIG. 5, "higher-order mode confinement loss" means confinement loss of the first higher-order mode. The sign "−" in the column of "higher-order mode confinement loss" means that the value is extremely large. As depicted in FIG. 5, each of the HFs according to Calculation Examples 1 to 22 has a wavelength dispersion value of −10 ps/nm/km to 10 ps/nm/km and an effective core area of 10 μm² or larger. However, when d/Λ is smaller than 0.4, eight or more layers of the holes are necessary to make the confinement loss of fundamental mode smaller than 0.1 dB/km ($1 \times 10^{-4}$ dB/m), and when d/Λ is larger than 0.6, the HF demonstrates multi-mode operation.

When d/Λ is 0.47 or smaller, the confinement loss of the first higher-order mode becomes 100 dB/m or larger, and stable single mode operation is ensured.

Figure 6:
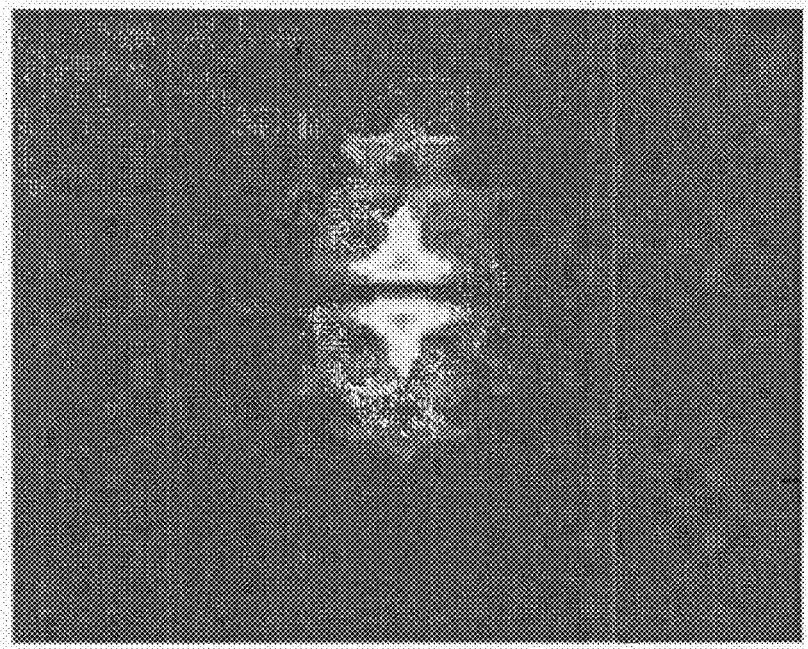
FIG. 6 is a diagram illustrating a field distribution of Calculation Example 9 in FIG. 5, that is, of a first higher-order mode of the HF having d/Λ of 0.50.
Figure 7:
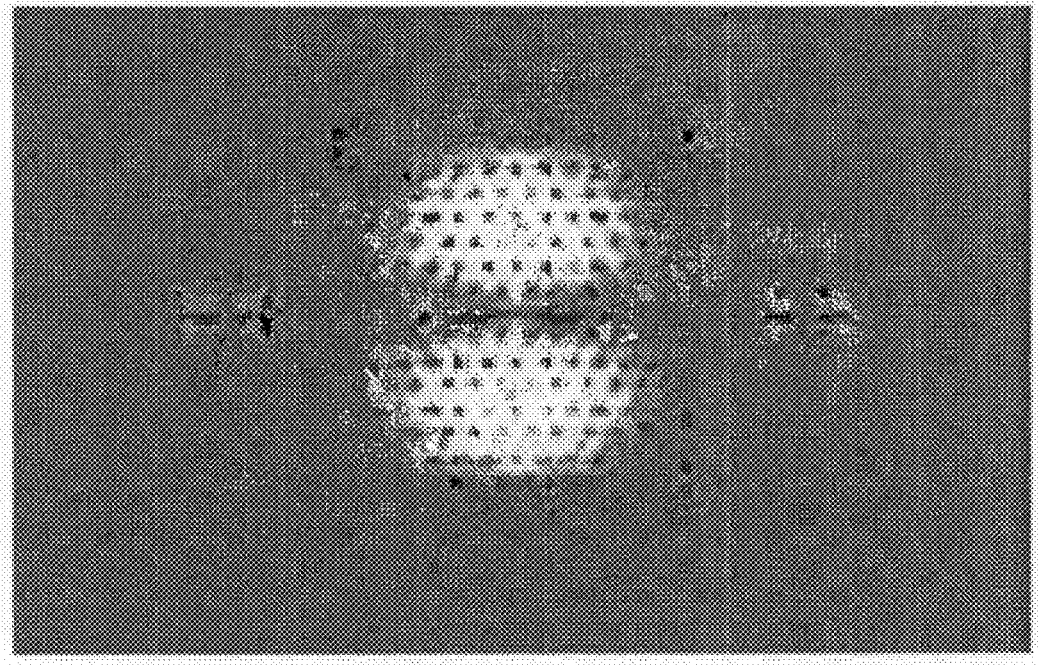
FIG. 7 is a diagram illustrating a field distribution of Calculation Example 6 in FIG. 5, that is, of a first higher-order mode of the HF having d/Λ of 0.40.

FIG. 6 is a diagram illustrating a field distribution of Calculation Example 9 in FIG. 5, that is, of a first higher-order mode of the HF having d/Λ of 0.50. Further, FIG. 7 is a diagram illustrating a field distribution of Calculation Example 6 in FIG. 5, that is, of a first higher-order mode of the HF having d/Λ of 0.40. As depicted in FIGS. 6 and 7, the field of the HF of Calculation Example 9 is confined well to a region around the center, and the field of the HF of Calculation Example 6 extends to the outside. As depicted in FIGS. 6 and 7, the HF of Calculation Example 6 having d/Λ of 0.40 is able to achieve more stable single mode operation.

Next, for HFs having the same structure as that of the HF 10 in FIG. 1, variation in confinement loss characteristics of the fundamental mode and the first higher-order mode when numbers of hole layers are changed is explained, using results of simulative calculations. One of the HFs used in these calculations has d/Λ of 0.50 and Λ of 4.0 μm, and the other has d/Λ of 0.47 and Λ of 3.3 μm.

Figure 8:
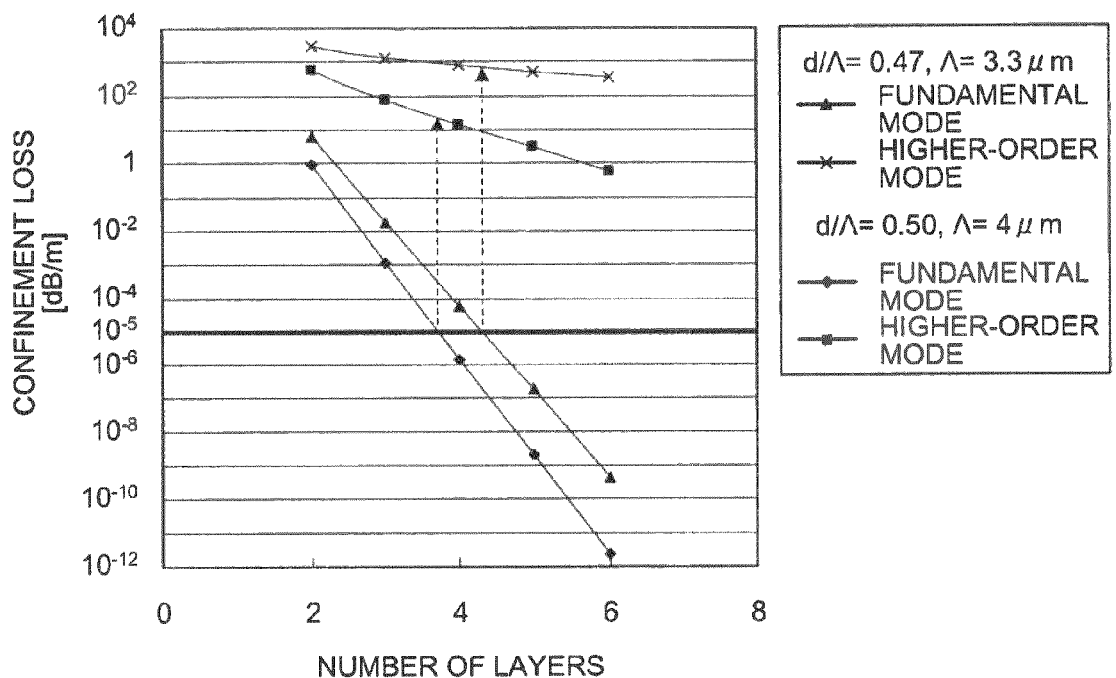
FIG. 8 is a diagram illustrating a relationship between the number of layers of the holes and confinement losses of fundamental modes and first higher-order modes for the HFs.

FIG. 8 is a diagram illustrating a relationship between the numbers of hole layers and the confinement losses of the fundamental mode and the first higher-order mode, for these two HFs. In FIG. 8, the thicker scale line for the vertical axis represents the position at which the confinement loss is 0.01 dB/km ($1 \times 10^{-5}$ dB/m). The broken-lined arrow represents for each HF the position of the first higher-order mode confinement loss corresponding to the position at which a line joining data points of the fundamental mode confinement loss crosses the thicker line at 0.01 dB/km. As depicted in FIG. 8, in the HF having d/Λ of 0.50, if the fundamental mode confinement loss is 0.01 dB/km, the first higher-order mode confinement loss becomes 20 dB/m to 30 dB/m, which is not 100 dB/m or greater. In the HF having d/Λ of 0.47 has, if the fundamental mode confinement loss is 0.01 dB/km, the first-order mode confinement loss becomes approximately 800 dB/m to 900 dB/m, which is sufficiently large, ensuring stable single mode operation.

Figure 9:
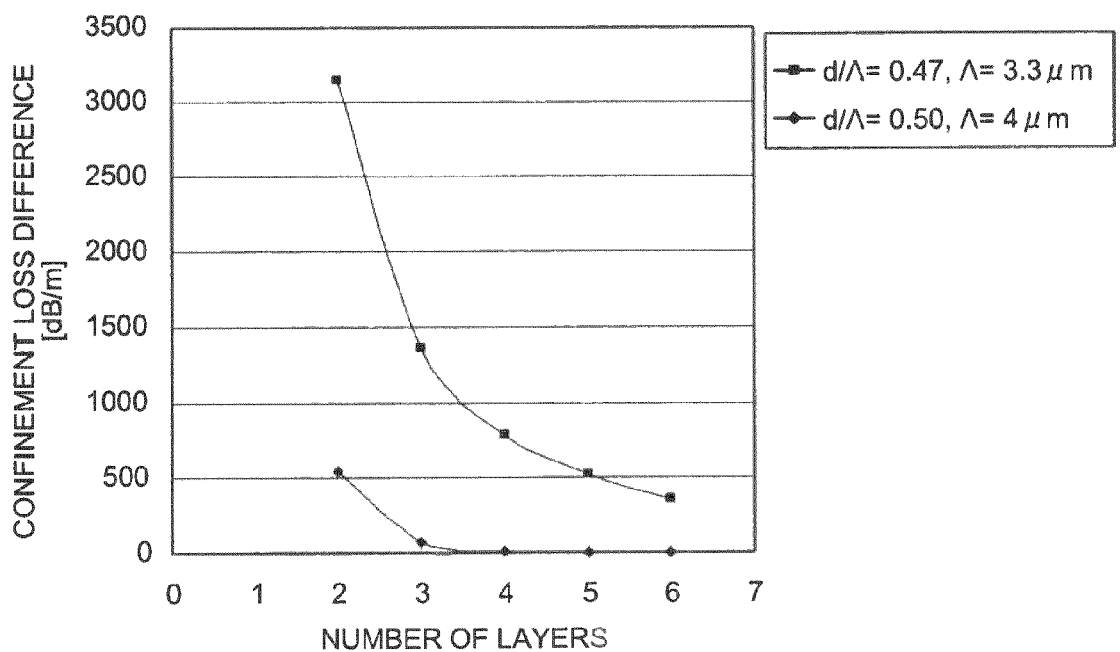
FIG. 9 is a diagram illustrating, for the HFs in FIG. 8, a relationship between the number of layers of the holes and differences between the first higher-order mode confinement losses and the fundamental mode confinement losses.

FIG. 9 is a diagram illustrating, for the HFs illustrated in FIG. 8, a relationship between the numbers of hole layers and the differences between the first higher-order mode confinement loss and the fundamental mode confinement loss. As depicted in FIG. 9, the HF having d/Λ of 0.50 has a very small confinement loss difference when the number of hole layers is four or more, i.e., when the fundamental mode confinement loss is sufficiently small due to the number of hole layers. The HF having d/Λ of 0.47 has a sufficiently large confinement loss difference when the number of hole layers is four or more and thus is suitable for achieving stable single mode operation.

If the confinement loss of the first higher-order mode is small, light of the first higher-order mode propagates over a long distance correspondingly with the small confinement loss. Propagation of light of the first higher-order mode through an HF of a short length and with a small first higher-order mode confinement loss is a cause of noise generation. Further, even if a long HF like an optical transmission line is used, propagation of light of the first higher-order mode through such a fiber is a cause of phenomena such as inter-mode interference and may reduce transmission performance. Therefore, the HF according to the embodiment of the present invention preferably has d/Λ of 0.47 or less to suppress the propagation of light of the first higher-order mode.

HFs made of pure silica glass and having the same structure as that of the HF 10 in FIG. 1 were produced using the stack and draw method. The design parameters, d/Λ, Λ, and the number of hole layers of Calculation Examples 7 and 10 in FIG. 5 were used for Production Examples 1 and 2, respectively.

Figures 10, 11:
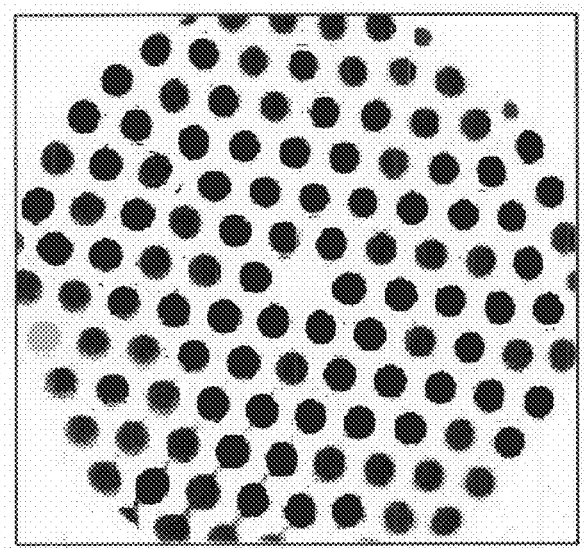
FIG. 10 is a photographic diagram of a cross sectional structure of the HF according to Production Example 2.
FIG. 11 is a table for comparing the optical characteristics of Calculation Examples 7 and 10 and measured values of optical characteristics of Production Examples 1 and 2.

FIG. 10 is a photographic diagram of a cross sectional structure of the HF according to Production Example 2 of the present invention. As depicted in FIG. 10, the produced HF has holes arranged in a triangular lattice, and the number of hole layers of five. In Production Example 1, Λ was about 3.3 μm and d/Λ was about 0.47, and in Production Example 2, Λ was about 3.5 μm and d/Λ was about 0.5, which were both substantially the same as the design parameters of Calculation Examples 7 and 10.

FIG. 11 is a table for comparing optical characteristics of Calculation Examples 7 and 10 and measured values of optical characteristics of Production Examples 1 and 2. As listed in FIG. 11, the optical characteristics of Production Examples 1 and 2 were confirmed to be very close to the optical characteristics obtained through the simulated calculations. Further, when fields of light propagating through the HFs according to Production Examples 1 and 2 were measured, modes other than the fundamental mode did not exist, and the HFs according to Production Examples 1 and 2 were confirmed to exhibit single-mode operation. In the HF according to Production Example 1, modes other than the fundamental mode did not exist even if 10 meters or less of the HF were used, but in the HF according to Production Example 2, higher-order mode propagation was observed up to 10 meters. The transmission losses in the HFs according to Production Examples 1 and 2 were 7.0 dB/km and 2.7 dB/km respectively, which were larger than those of Calculation Examples 7 and 10. This was considered to be caused by the loss through the glass or scattering loss at the surface of the holes.

Figure 12:
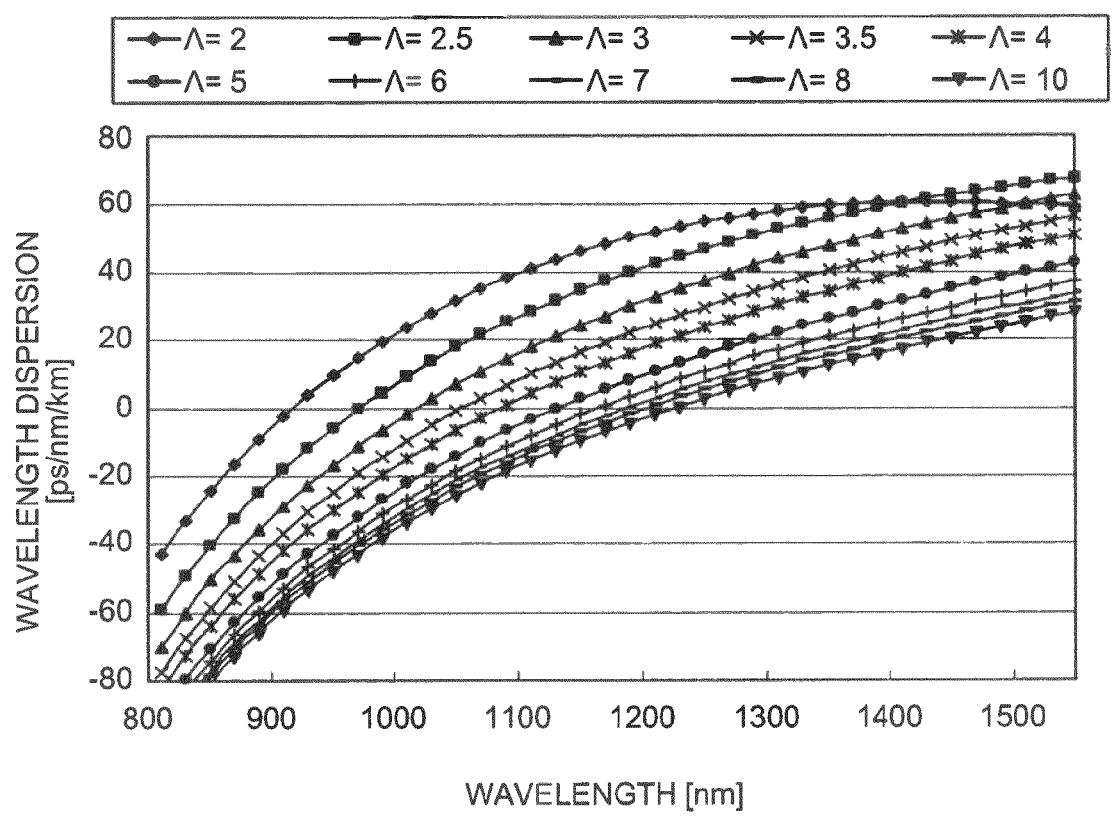
FIG. 12 is a diagram illustrating, for the HF depicted in FIG. 1, the wavelength dispersion characteristics when d/Λ is set to 0.50 and Λ is changed from 2.0 μm to 10.0 μm.

Next, variation in characteristics for the HF depicted in FIG. 1 having five hole layers, when d/Λ is set to 0.50, and Λ is changed, is explained based on results of calculations using simulation. FIG. 12 is a diagram illustrating, for the HF in FIG. 1, wavelength dispersion characteristics when d/Λ is set to 0.50, and Λ is changed from 2.0 μm to 10.0 μm. FIG. 13 is a table listing optical characteristics at the wavelengths of 1050 nm and 1550 nm.

As indicated by FIGS. 12 and 13, as Λ is decreased, the zero-dispersion wavelength becomes shorter, and becomes 1050 nm when Λ is around 3.5 μm. When Λ is 3.5 μm, the dispersion slope w is about 0.20 ps/nm$^2$/km and the effective core area is about 15 μm$^2$. When Λ is 3.5 μm, not only at the wavelength of 1050 nm, but also at 1550 nm, the confinement loss becomes 0.01 dB/km or less, confirming that it is possible to achieve small confinement loss over a wide band. It has also been confirmed that it is also possible to achieve minute wavelength dispersion within ±10 ps/nm/km at the wavelength of 1050 nm, if for example Λ is set to 3.0 μm or 4.0 μm.

Figure 14:
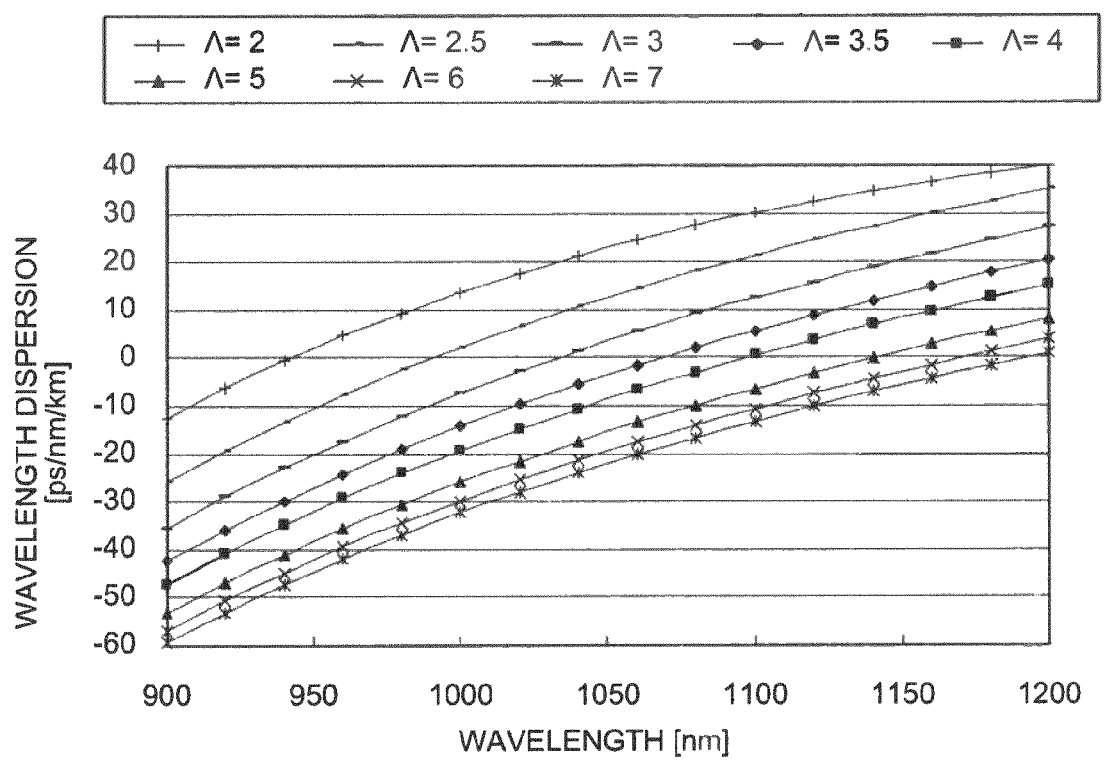
FIG. 14 is a diagram illustrating, for the HF depicted in FIG. 1, the wavelength dispersion characteristics when d/Λ is set to 0.45 and Λ is changed from 2.0 μm to 7.0 μm.

Next, variation in characteristics of the HF in FIG. 1 having five hole layers when d/Λ is set to 0.45, which is considered to be an optimum value for ensuring stable single mode operation, and Λ is changed is explained, using results of calculations using simulation. FIG. 14 is a diagram illustrating wavelength dispersion characteristics of the HF in FIG. 1 when d/Λ is set to 0.45 and Λ is changed from 2.0 μm to 7.0 μm. FIG. 15 is a table listing optical characteristics at the wavelength of 0.55 μm to 1.70 μm, when the number of hole layers in the HF in FIG. 1 is set to three, d/Λ is set to 0.45, and Λ is changed from 2.0 μm to 7.0 μm. FIG. 16 is a table listing optical characteristics at the wavelength of 0.55 μm to 1.70 μm, when the number of hole layers is set to four in the HF in FIG. 1, d/Λ is set to 0.45, and Λ is changed from 2.0 μm to 7.0 μm. FIG. 17 is a table listing optical characteristics at the wavelength of 0.55 μm to 1.70 μm, when the number of hole layers is set to five in the HF in FIG. 1, d/Λ is set to 0.45, and Λ is changed from 2.0 μm to 7.0 μm. In FIGS. 15 to 17, the confinement loss refers to the confinement loss of the fundamental mode.

As depicted in FIG. 14, as Λ is decreased, the zero-dispersion wavelength becomes shorter, and becomes 1050 nm when Λ is around 3.0 μm to 3.5 μm. When the number of hole layers is five and Λ is 3.5 μm, the confinement loss is 0.1 dB/km or less not only at the wavelength of 1050 nm but also at 1550 nm (1.55 μm), confirming that it is possible to achieve small confinement loss over a wide band. Further, when the number of hole layers if five, if Λ is set to 3.0 μm or greater and 4.0 μm or less, it is possible to achieve minute wavelength dispersion within ±10 ps/nm/km at the wavelength of 1050 nm. Furthermore, in FIGS. 15 to 17, if a certain value of Λ is set, it is possible to select an optimum number of layers based on the value of confinement loss.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:
1. A holey fiber comprising:
a core region at a center of the holey fiber;
a cladding region around the core region;
a plurality of holes included in the cladding region, formed in layers around the core region, arranged to form a triangular lattice having a lattice constant Λ of 2.5 micrometers to 4.5 micrometers, and each having a diameter of d micrometers; and
a wavelength dispersion value of −10 ps/nm/km to 10 ps/nm/km at a wavelength of 1050 nanometers when d/Λ is 0.4 to 0.47, wherein
a number of the layers of the plurality of holes is equal to or less than seven,
a confinement loss of the holey fiber at the wavelength of 1050 nanometers is equal to or less than 0.1 dB/km,
an effective core area of the holey fiber at the wavelength of 1050 nanometers is equal to or larger than 10 μm$^2$, and
the holey fiber demonstrates a single-mode operation at a wavelength of 1000 nanometers.

2. The holey fiber according to claim 1, wherein a confinement loss of a lowest order mode among higher-order optical propagation modes of the holey fiber at the wavelength of 1050 nanometers is equal to or more than 100 dB/m.

\* \* \* \* \*